United States Patent
Kunieda et al.

(10) Patent No.: US 11,071,945 B2
(45) Date of Patent: Jul. 27, 2021

(54) FILTER MEMBRANE

(71) Applicant: IBIDEN CO., LTD., Ogaki (JP)

(72) Inventors: Masatoshi Kunieda, Ogaki (JP);
Hirokazu Higashi, Ogaki (JP);
Tatsuhiro Kawai, Ogaki (JP)

(73) Assignee: IBIDEN CO., LTD., Ogaki (JP)

(*) Notice: Subject to any disclaimer, the term of this patent is extended or adjusted under 35 U.S.C. 154(b) by 362 days.

(21) Appl. No.: 16/260,495

(22) Filed: Jan. 29, 2019

(65) Prior Publication Data
US 2019/0232218 A1 Aug. 1, 2019

(30) Foreign Application Priority Data
Jan. 30, 2018 (JP) .............................. JP2018-013768

(51) Int. Cl.
*B01D 53/22* (2006.01)
*B01D 69/06* (2006.01)
(Continued)

(52) U.S. Cl.
CPC ........... *B01D 53/228* (2013.01); *B01D 39/00* (2013.01); *B01D 69/02* (2013.01); *B01D 69/06* (2013.01); *B01D 69/10* (2013.01); *B01D 69/12* (2013.01); *B01D 61/14* (2013.01); *B01D 2257/91* (2013.01); *B01D 2325/02* (2013.01);
(Continued)

(58) Field of Classification Search
CPC .............. B01D 2325/06; B01D 69/06; B01D 2325/44; B01D 2257/91; B01D 2325/08; B01D 69/02; B01D 53/228; B01D 2325/022; B01D 2325/02; B01D 39/00; B01D 69/12; B01D 61/14; B01D 69/10
See application file for complete search history.

(56) References Cited

U.S. PATENT DOCUMENTS 3,840,402 A * 10/1974 Tobin ................. B01D 46/2411
134/29
2003/0013236 A1* 1/2003 Nakata ................ H01L 27/1244
438/149
(Continued)

FOREIGN PATENT DOCUMENTS

JP     2008-086996 A    4/2008
JP     2011-078481 A    4/2011

*Primary Examiner* — Anthony R Shumate
(74) *Attorney, Agent, or Firm* — Oblon, McClelland, Maier & Neustadt, L.L.P.

(57) ABSTRACT

A filter membrane includes a membrane having through holes that selectively separates specific material in processing medium, the membrane including first, second and third layers such that the first layer has first surface that is supplied with processing medium, the third layer has second surface on the opposite side of the first surface, and the second layer is formed between the first and third layers. The first layer includes first convex and concave portions, the third layer includes second convex and concave portions each having a larger area than each first concave portion, the second convex portions are formed to surround the second concave portions and connected to one another, the second layer has through holes connecting the second concave portions and first set of the first concave portions, and the first concave portions include second set in regions opposing the second convex portions that is connected to each other.

20 Claims, 10 Drawing Sheets

(51) Int. Cl.
  *B01D 69/12*      (2006.01)
  *B01D 39/00*      (2006.01)
  *B01D 69/02*      (2006.01)
  *B01D 69/10*      (2006.01)
  *B01D 61/14*      (2006.01)

(52) U.S. Cl.
  CPC .... *B01D 2325/022* (2013.01); *B01D 2325/06* (2013.01); *B01D 2325/08* (2013.01); *B01D 2325/44* (2013.01)

(56) References Cited

U.S. PATENT DOCUMENTS

| | | | |
|---|---|---|---|
| 2005/0116793 A1* | 6/2005 | Shoji | H03H 7/427 333/185 |
| 2005/0118969 A1* | 6/2005 | Shoji | H04B 15/02 455/213 |
| 2012/0135661 A1* | 5/2012 | Imanishi | C08L 79/08 445/24 |
| 2014/0145286 A1* | 5/2014 | Aoyagi | C09D 7/41 257/432 |
| 2014/0151614 A1* | 6/2014 | Muro | G02B 5/22 252/586 |
| 2016/0181294 A1* | 6/2016 | Zhao | H01L 27/1462 257/292 |
| 2016/0249443 A1* | 8/2016 | Shiraishi | H05G 2/008 |
| 2017/0017129 A1* | 1/2017 | Zhao | G02F 1/136204 |
| 2018/0173066 A1* | 6/2018 | Chen | G02F 1/1345 |
| 2019/0249320 A1* | 8/2019 | Shigeta | G02B 26/023 |
| 2020/0296518 A1* | 9/2020 | Take | B81C 1/00333 |

* cited by examiner

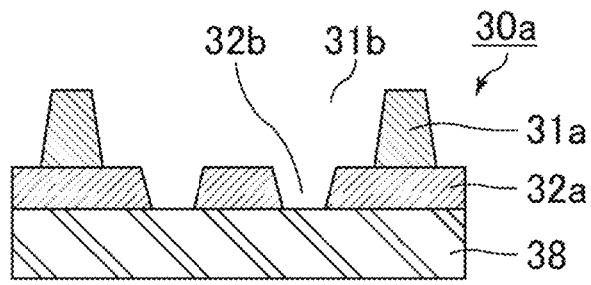
FIG. 6A
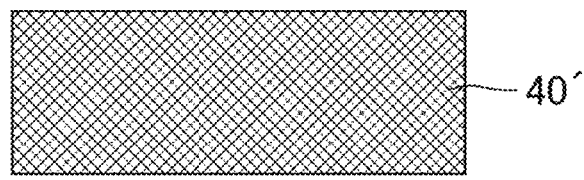
FIG. 6B
FIG. 6C
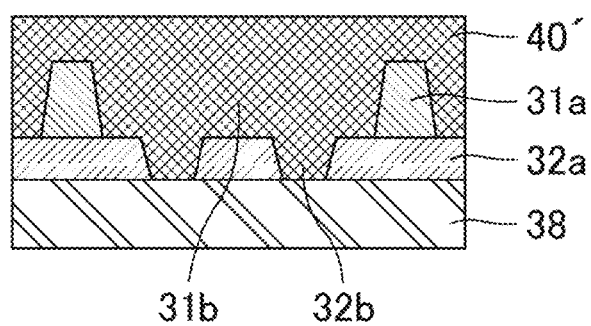
FIG. 6D
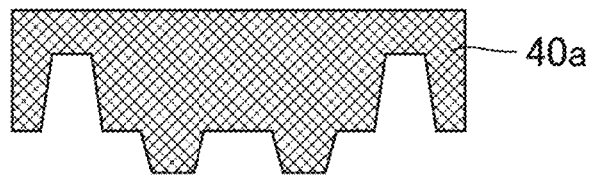

FILTER MEMBRANE

CROSS-REFERENCE TO RELATED APPLICATIONS

The present application is based upon and claims the benefit of priority to Japanese Patent Application No. 2018-013768, filed Jan. 30, 2018, the entire contents of which are incorporated herein by reference.

BACKGROUND OF THE INVENTION

Field of the Invention

The present invention relates to a filter membrane.

Description of Background Art

Various filters for removing pollutants from the polluted atmosphere have been studied (see Japanese Patent Laid-Open Publication No. 2011-78481). Japanese Patent Laid-Open Publication No. 2008-86996 describes a filter membrane that includes a polymer filter layer having multiple precision-formed micron-scale pores penetrating therethrough in a thickness direction and a polymer support layer having a precision-formed porous support structure. The entire contents of these publications are incorporated herein by reference.

SUMMARY OF THE INVENTION

According to one aspect of the present invention, a filter membrane includes a membrane having through holes that selectively separates a specific material from other materials in a processing medium, the membrane including a first layer, a second layer and a third layer formed such that the first layer has a first surface that is supplied with the processing medium, the third layer has a second surface on an opposite side with respect to the first surface of the first layer, and the second layer is formed between the first layer and the third layer. The first layer includes first convex portions and first concave portions formed such that each of the first convex portions is formed from an interface between the second layer and the first layer toward the first surface of the first layer and has a cross-sectional area parallel to the first surface gradually decreasing toward the first surface of the layer, and that each of the first concave portions has a bottom at the interface between the second layer and the first layer, the third layer includes second convex portions and second concave portions formed such that each of the second convex portions is formed from an interface between the second layer and the third layer toward the second surface and has a cross-sectional area parallel to the second surface gradually decreasing toward the second surface, and that each of the second concave portions has a bottom at the interface between the second layer and the third layer and has a larger area than each of the first concave portions, the third layer is formed such that the second convex portions are formed to surround the second concave portions and connected to one another, the second layer has through holes connecting the second concave portions and a first set of the first concave portions, and the first concave portions includes a second set of the first concave portions formed in regions opposing the second convex portions such that the second set of the first concave portions in each of the regions is connected to each other.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 6A-6D are cross-sectional views schematically illustrating a first transfer mold fabrication process in a method for manufacturing a filter membrane according to an embodiment of the present invention;

DETAILED DESCRIPTION OF THE EMBODIMENTS

Figure 1A:
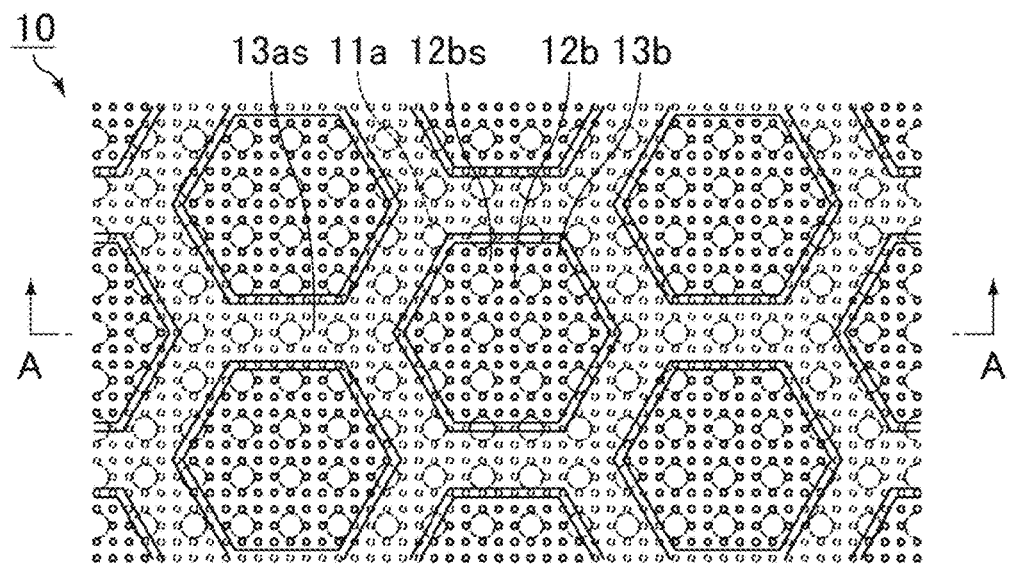
FIG. 1A is a back view schematically illustrating a filter membrane according to an embodiment of the present invention.

Embodiments will now be described with reference to the accompanying drawings, wherein like reference numerals designate corresponding or identical elements throughout the various drawings.

A filter membrane according to an embodiment of the present invention is a filter membrane in which multiple through holes are formed and the through holes are used to selectively separate a specific material in a processing medium from other materials.

The filter membrane includes: a first layer having a first surface on a side where the processing medium is supplied;

a third layer having a second surface on an opposite side with respect to the first surface; and a second layer formed between the first layer and the third layer.

The first layer includes: first convex portions that are each formed from an interface between the second layer and the first layer toward the first surface and are each provided such that a cross-sectional area thereof parallel to the first surface gradually decreases with a decreasing distance to the first surface; and first concave portions that each have a bottom at the interface between the second layer and the first layer.

The third layer includes: second convex portions that are each formed from an interface between the second layer and the third layer toward the second surface and are each provided such that a cross-sectional area thereof parallel to the second surface gradually decreases with a decreasing distance to the second surface; and second concave portions that each have a bottom at the interface between the second layer and the third layer. The second concave portions each have a larger area than each of the first concave portions and are scattered in a form of islands, and the second convex portions formed around the second concave portions are formed so as to be connected to each other and have the entirely continuous second surface.

In regions of the second layer where the second concave portions are formed, the through holes are formed communicatively connecting the first concave portions and the second concave portions.

At least the first concave portions for lied in regions opposing the second convex portions are connected to each other.

A filter membrane according to an embodiment of the present invention can be used as a filter membrane for removing dust, viruses, bacteria and the like present in air or a gas of a specific component and a liquid to obtain clean air, gas, liquid and the like, and, conversely, can also be used as a filter membrane for obtaining, by selectively filtering and separating, only particles, viruses, bacteria, cells and the like of specific sizes present in air or a gas of a specific component and a liquid, and, in particular, can be suitably used as a filter membrane for separating solid contents such as cells or blood cells from a body fluid.

An example of a shape, a structure and the like of a filter membrane according to an embodiment of the present invention is further described in detail.

Figure 1B:
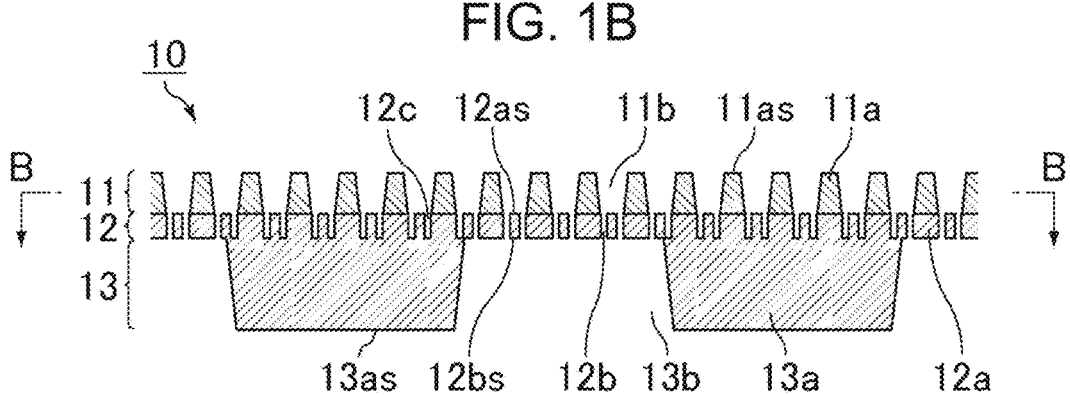
FIG. 1B is an A-A line cross-sectional view of the filter membrane illustrated in FIG. 1A.
Figure 1C:
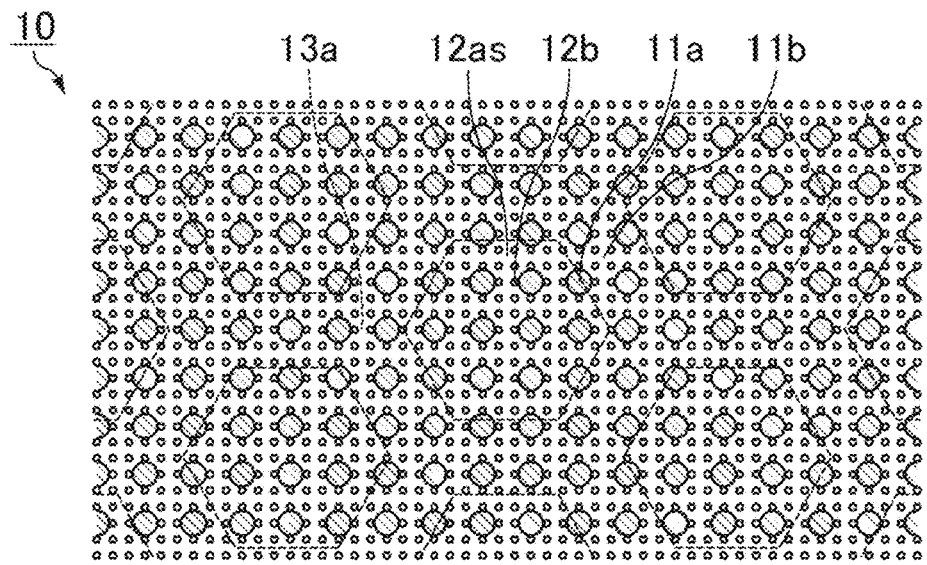
FIG. 1C is a B-B line cross-sectional view of the filter membrane illustrated in FIG. 1B.

FIG. 1A is a back view schematically illustrating an example of a filter membrane according to an embodiment of the present invention. FIG. 1B is an A-A line cross-sectional view of the filter membrane illustrated in FIG. 1A. FIG. 1C is a B-B line cross-sectional view of the filter membrane illustrated in FIG. 1B. FIG. 1C illustrates a front side surface of a filter membrane according to an embodiment of the present invention.

A filter membrane 10 according to an embodiment of the present invention illustrated in FIG. 1A-1C is formed from a first layer 11 having a first surface (11 as) on a side where a processing medium is supplied, a third layer 13 having a second surface (13as) on an opposite side with respect to the first surface (11as), and a second layer 12 formed between the first layer 11 and the third layer 13.

The first layer 11 is formed from first convex portions (11a) and first concave portions (11b), the first convex portions (11a) each being formed from an interface (12as) between the second layer 12 and the first layer 11 toward the first surface (11as) and each being provided such that a cross-sectional area thereof parallel to the first surface (11as) gradually decreases with a decreasing distance to the first surface (11as), and the first concave portions (11b) each having a bottom at the interface (12as) between the second layer 12 and the first layer 11.

The third layer 13 is formed from second convex portions (13a) and second concave portions (13b), the second convex portions (13a) each being formed from an interface (12bs) between the second layer 12 and the third layer 13 toward the second surface (13as) and each being provided such that a cross-sectional area thereof parallel to the second surface (13as) gradually decreases with a decreasing distance to the second surface (13as), and the second concave portions (13b) each having a bottom at the interface (12bs) between the second layer 12 and the third layer 13. Then, as illustrated in FIG. 1A-1C, the second concave portions (13b) each have a larger area than each of the first concave portions (11b) and are scattered in a form of islands, and the second convex portions (13a) formed around the second concave portions (13b) are formed so as to be connected to each other and have the entirely continuous second surface (13as).

Further, in regions of the second layer 12 where the second concave portions (13b) are formed, through holes (12b) communicatively connecting the first concave portions (11b) and the second concave portions (13b) are formed. A portion of the second layer 12 other than the through holes (12b) is referred to as a second layer membrane portion (12a).

In the back view illustrated in FIG. 1A, the second surface (13as) forming the second convex portions (13a) is formed in a shape of sides having predetermined widths forming a honeycomb shape in a plan view, and is entirely connected together, and the second concave portions (13b) are each formed in a hexagonal shape in a plan view and are scattered in a form of islands.

Since the first convex portions (11a) are each formed such that the cross-sectional area thereof parallel to the first surface (11as) gradually decreases with a decreasing distance to the first surface (11as), conversely, a cross-sectional area of each of the first concave portions (11b) parallel to the first surface (11as) gradually increases with a decreasing distance to the first surface (11as). As a result, during filtration, even when substances not to be filtered larger than the through holes (12b) formed in the second layer 12 approach the first surface (11as), gaps are likely to be formed between the through holes (12b) and the substances not to be filtered, and the through holes (12b) are unlikely to be blocked. As a result, the filter membrane is unlikely to be blocked by the substances not to be filtered.

In a filter membrane 10 according to an embodiment of the present invention, a thick portion (rib portion) including the second layer 12 and the second convex portions (13a) of the third layer 13 continuously exists over the entire filter membrane. Therefore, the filter membrane has a high mechanical strength and is self-supportive, and, even when the filter membrane is not supported by any other support or the like, the filter membrane can maintain its shape with a film membrane alone, and the film membrane does not cause massive irreversible aggregation. Further, due to the above characteristics, breakage of the filter membrane due to a temperature change or a pressure during use of the filter can be prevented.

In a filter membrane 10 according to an embodiment of the present invention, as illustrated in FIG. 1A-1C, in the regions of the second layer 12 where the second concave portions (13b) are formed, the through holes (12b) communicatively connecting the first concave portions (11b) and the second concave portions (13b) are formed in the second layer 12. Therefore, the through holes (12b) function as a filter, and can be used as a filter membrane that selectively separates specific substances in a processing medium from other substances.

On the other hand, at least the first concave portions (11b) of the first layer 11 formed in regions opposing the second convex portions (13a) of the third layer 13 are connected to each other, and the first convex portions are each formed in an isolated shape. Therefore, a liquid that has flowed into the regions opposing the second convex portions (13a) also flows into the through holes (12b) via the first concave portions (11b).

In this way, the filter membrane is structured such that a liquid to be filtered flowing into the entire surface thereof can flow toward the through holes (12b). Therefore, the filter membrane has a large filtration capacity, and, when the filter membrane is used in an application such as an inspection or an experiment, a filtration process can be efficiently performed.

In the regions opposing the second convex portions (13a) of the third layer 13, bottomed holes (12c) each extending to a vicinity of the interface between the second layer 12 and the third layer 13 or to the interface are formed. The bottomed holes (12c) do not have any specific effect, but do not adversely affect the function of the filter membrane. Therefore, in a process for forming the through holes (12b), when the regions opposing the second convex portions (13a) are excluded, production efficiency decreases. Therefore, the bottomed holes (12c) are formed. However, since it is technically possible, it is also possible that the bottomed holes (12c) are not formed in the regions opposing the second convex portions (13a).

A filter membrane according to an embodiment of the present invention can be conceptually considered as being divided into the above-described three layers. However, it is desirable that the filter membrane itself be entirely formed of the same material and be integrally formed.

When the filter membrane is entirely formed of the same material and is integrally formed, the filter membrane can have more excellent mechanical properties without a risk of causing layer separation as in a case where three or two layers are adhered to each other, and a disadvantage that occurs in the case where three layers are adhered to each other, that is, variation in pore areas or pore diameters, is unlikely to occur. Therefore, when the filter membrane is used in an application such as an inspection or an experiment, data with good reproducibility can be obtained.

Examples of a resin material that forms a filter membrane according to an embodiment of the present invention include a silicone-based resin, an acrylic resin, a polyimide resin, a phenol resin, a silica hybrid composite, and the like. The above-described resins are highly flexible and thus allow the filter membrane to have excellent mechanical properties and allow a self-supporting property of the filter membrane to be easily ensured. A method for manufacturing a filter membrane according to an embodiment of the present invention will be described in detail later.

Further, as a resin material for forming a filter membrane according to an embodiment of the present invention, a silicone-based resin, an acrylic resin, a polyimide resin, a phenol resin or the like of a negative type can be used. When these resins are used, by irradiating light such as ultraviolet light, an irradiated portion is cured, and a portion not irradiated with light can be dissolved using a liquid developer and removed. As a resin material forming a filter membrane according to an embodiment of the present invention, it is also possible that a positive type photosensitive resin is used. Whether a negative type resin or a positive type resin is to be used may be determined according to accuracy or the like of the filter membrane to be formed.

A silicone-based resin is obtained by combining trialkoxysilane and the like with tetrafunctional tetraalkoxysilane as a main component, and a three-dimensional structure of SiO is finally formed in the resin. Further, a silicone-based resin can be cured by using a catalyst, or by heating. In this way, when a silicone-based resin is used as a resin film, the resin film has a three-dimensional structure of SiO and thus has flexibility and also has excellent wear resistance.

An acrylic resin is formed of polyfunctional monomers, monofunctional monomer, and polymers, and is obtained by controlling a degree of cross-linking based on types and amounts of polyfunctional monomers. Examples of polyfunctional monomers include polyol acrylate, polyester acrylate, urethane acrylate, epoxy acrylate and the like. In this way, when an acrylic resin is used as a resin film, the resin film has a feature of being able to be cured in a short time period by ultraviolet irradiation.

A silica hybrid composite is obtained by combining inorganic fine particles of silica sol or the like or three-dimensional structures of SiO obtained using the above-described silicone-based resin and an acrylic resin used for limning a hard coat layer or other resins. By combining resins having a radically polymerizable acryloyl group (AC), a methacryloyl group (MAC), or a cationically polymerizable oxetanyl group (OX), the silica hybrid composite can be cured by irradiating light such as ultraviolet light.

Figure 2:
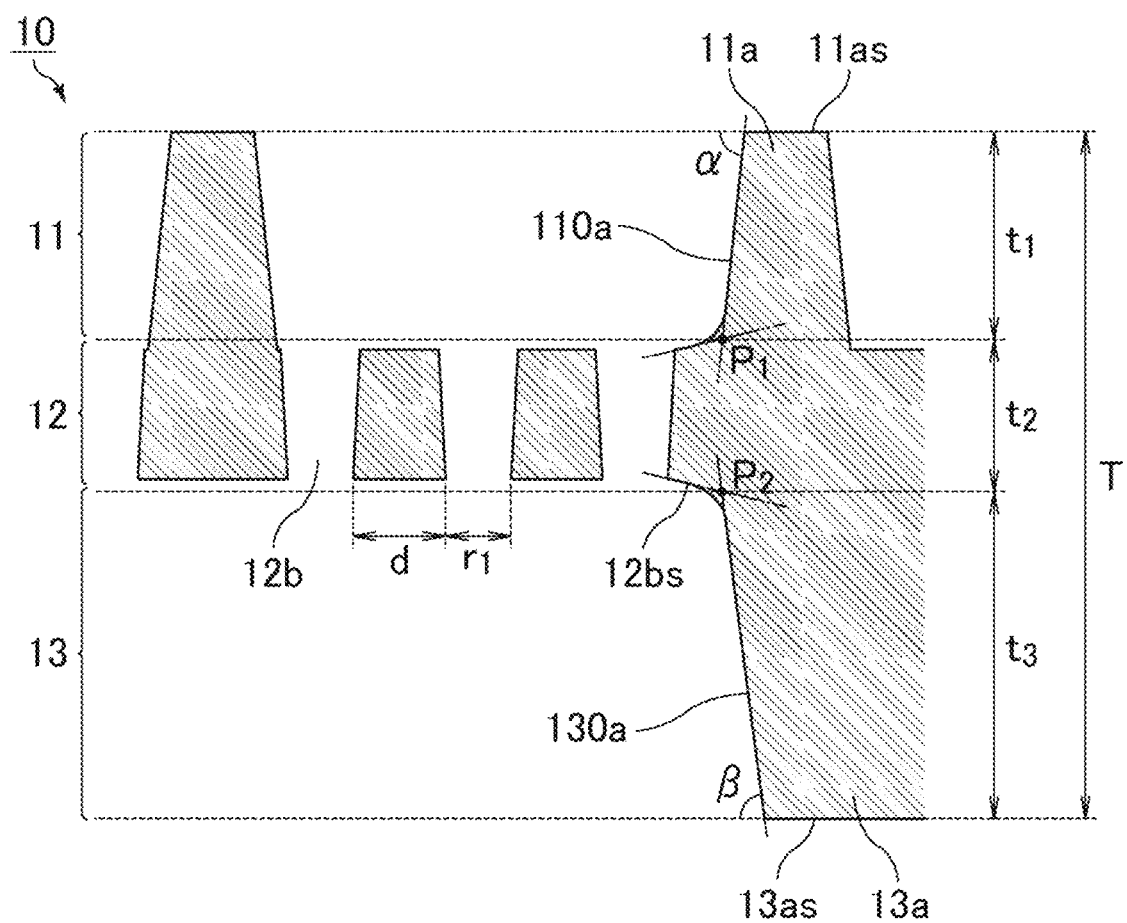
FIG. 2 is an enlarged cross-sectional view in which a portion of the cross-sectional view illustrated in FIG. 1B is enlarged.

FIG. 2 is an enlarged cross-sectional view in which a portion of the cross-sectional view illustrated in FIG. 1B is enlarged.

As illustrated in FIG. 2, a diameter ($r_1$) of each of the through holes is a diameter of each of the through holes (12b) at the interface (12bs) between the second layer 12 and the third layer 13. Further, as illustrated in FIG. 2, a distance (d) between through holes is a shortest distance from an edge of a through hole (12b) to an edge of a closest another through hole (12b) at the interface (12bs) between the second layer 12 and the third layer 13.

Values of the diameter ($r_1$) of each of the through holes (12b) and the distance (d) between the through holes (12b) can be measured from a photograph obtained by photographing the filter membrane from the second surface (13as) side using a scanning electron microscope (SEM).

In a filter membrane 10 according to an embodiment of the present invention, when the interface (12as) between the first layer 11 and the second layer 12 is not parallel to the first surface (11as), in a cross section perpendicular to the first surface (11as), a shortest distance between a point ($p_1$), at which a line obtained by extending the interface between the first layer 11 and the second layer 12 and a line obtained by extending a wall surface (110a) of a first convex portion (11a) intersects, and the first surface (11as) is taken as a thickness ($t_1$) of the first layer 11.

Further, similarly, when the interface between the second layer 12 and the third layer 13 is not parallel to the second surface (13as), in a cross section perpendicular to the second surface (13as), a shortest distance between a point ($p_2$), at which a line obtained by extending the interface between the second layer 12 and the third layer 13 and a line obtained by extending a wall surface (130a) of a second convex portion (13a) intersects, and the second surface (13as) is taken as a thickness ($t_3$) of the third layer 13.

A thickness ($t_2$) of the second layer 12 is a value obtained by subtracting the thickness ($t_1$) of the first layer 11 and the thickness ($t_3$) of the third layer 13 from a total thickness (T) of the filter membrane.

Further, in FIG. 2, an angle formed by the wall surface (110a) of the first convex portion (11a) continuing from the first surface (11as) and the first surface (11as) is indicated using α, and, in FIG. 2, an angle formed by the wall surface (130a) of the second convex portion (13a) continuing from the second surface (13as) and the second surface (13as) is indicated using β.

In a filter membrane according to an embodiment of the present invention, the diameter ($r_1$) of the through holes communicatively connecting the first concave portions and the second concave portions is desirably 0.1-1.0 μm.

The value of the diameter ($r_1$) of each of the through holes can be measured from a photograph obtained by photographing the second surface of the filter membrane using a scanning electron microscope (SEM).

Shapes of the through holes viewed from the second surface are not particularly limited, and may be circular shapes, elliptical shapes, racetrack shapes, or shapes formed by other curves. The shape of each of the through holes viewed from the second surface may be a polygonal shape such as a quadrangular shape. However, in order to smoothly perform filtration, a shape formed by a curve such as a circle or an ellipse is preferable.

Further, in a filter membrane according to an embodiment of the present invention, when the shape of each of the through holes viewed from the second surface in a plan view is not a circle, a width of a narrowest portion is taken as the diameter ($r_1$) of each of the through holes.

In a filter membrane according to an embodiment of the present invention, when the diameter ($r_1$) of each of the through holes is 0.1-1.0 μm, extremely fine dust, viruses and the like can be removed from a gas or the like containing the dust, the viruses and the like. Further, fine components in a liquid such as those that form cells can also be selectively separated by filtration.

In a filter membrane according to an embodiment of the present invention, when the diameter ($r_1$) of each of the through holes is less than 0.1 μm, since the diameter of each of the through holes is too small, when attempting to form accurate through holes, cost for forming the through holes becomes excessively high. On the other hand, when the diameter ($r_1$) of the through holes exceeds 1.0 μm, since the diameter of each of the through holes becomes too large and filtration becomes easy, even when a filter membrane having the through holes structured as in an embodiment of the present invention is fabricated, features of a filter membrane according to an embodiment of the present invention cannot be fully exhibited.

In a filter membrane according to an embodiment of the present invention, a relation between the distance (d) between the through holes and the diameter ($r_1$) of each of the through holes is desirably $0.2r_1 \leq d \leq 1.2r_1$.

In a filter membrane according to an embodiment of the present invention, when the relation between the distance (d) between the through holes and the diameter ($r_1$) of each of the through holes is $0.2r_1 \leq d \, 1.2r_1$, the number of the through holes per unit area is sufficiently large and the mechanical strength can also be maintained, and filtration can be efficiently performed using a filter membrane excellent in durability.

When the distance (d) between the through holes is less than $0.2r_1$ with respect to the diameter ($r_1$) of each of the through holes, since the distance (d) is too short, the filter membrane is decreased in strength and can be easily broken. On the other hand, when the distance (d) between the through holes exceeds $1.2r_1$ with respect to the diameter ($r_1$) of each of the through holes, since the distance between the through holes is too long, the number of the through holes per unit area is decreased and efficiency of filtration is decreased.

In a filter membrane according to an embodiment of the present invention, in a cross-sectional shape perpendicular to the first surface including one of the first convex portions, the angle (α) formed by the wall surface of the one of the first convex portions and the first surface is desirably 43-80 degrees.

In a filter membrane according to an embodiment of the present invention, when the angle (α) formed by the wall surface of the first convex portion and the first surface is 43-80 degrees, the first concave portions are each formed such that the cross-sectional area thereof parallel to the first surface gradually increases with a decreasing distance to the first surface. Therefore, the filter membrane is unlikely to be blocked by substances not to be filtered, and filtration can be continuously performed over a long time period, and a filtration process can be efficiently completed.

In a filter membrane according to an embodiment of the present invention, in a cross-sectional shape perpendicular to the second surface including one of the second convex portions, the angle (β) formed by the wall surface of the one of the second convex portions and the second surface is desirably 43-80 degrees.

In a filter membrane according to an embodiment of the present invention, in a cross-sectional shape perpendicular to the second surface including one of the second convex portions, when the angle (β) formed by the wall surface of the one of the second convex portions and the second surface is 43-80 degrees, the second concave portions are each formed such that the cross-sectional area thereof parallel to the second surface gradually increases with a decreasing distance to the second surface. Therefore, a liquid contained in an object to be filtered can be easily discharged, and a filtration process can be efficiently performed.

In a filter membrane according to an embodiment of the present invention, a thickness of the second convex portions forming the third layer ($t_3$) is desirably larger than a total thickness of the first layer ($t_1$) and the second layer ($t_2$).

In a filter membrane according to an embodiment of the present invention, when the thickness of the second convex portions forming the third layer is larger than the total thickness of the first layer and the second layer, the mechanical strength of the rib portion supporting the entire filter membrane is increased, and the self-supportability is increased.

Further, the total thickness (T) of the first layer ($t_1$), the second layer ($t_2$) and the third layer ($t_3$) is preferably 15 pin or less.

In a filter membrane according to an embodiment of the present invention, when the total thickness (T) of the first layer, the second layer and the third layer is as small as 15 μm or less, the shapes of the through holes can be kept uniform, and data with excellent reproducibility can be easily obtained. Further, since the filter membrane is thin, substances to be filtered can easily pass through, and filtration can be efficiently and quickly performed.

In a filter membrane according to an embodiment of the present invention, a ratio of an area of the first surface forming the first convex portions per unit area to an area of the second surface forming the second convex portions per unit area is desirably 50-90%.

In a filter membrane according to an embodiment of the present invention, when the ratio of the area of the first surface forming the first convex portions per unit area to the area of the second surface forming the second convex portions per unit area is 50-90%, an area (volume) of the second convex portions which is on an opposite side with respect to the side where the processing medium is supplied is increased. Therefore, the filter membrane can have a higher mechanical strength, and a portion where the through holes are formed can also have a wide filtration area.

In a filter membrane according to an embodiment of the present invention, a ratio of a total area ($a_1$) of the first surface forming the first convex portions to a total area (A) of the filter membrane in a plan view is desirably 20-50%.

In a filter membrane according to an embodiment of the present invention, when the ratio of the total area ($a_1$) of the first surface forming the first convex portions to the total area (A) of the filter membrane in a plan view is 20-50%, when the ratio of the first convex portions is relatively small, an area of the first concave portions per unit area becomes sufficiently large and an area of a portion of the through holes performing filtration can be increased. Therefore, filtration can be efficiently performed.

In a filter membrane according to an embodiment of the present invention, a ratio of a total area ($b_1$) of the second surface forming the second convex portions to the total area (A) of the filter membrane in a plan view is preferably 50-70%.

In a filter membrane according to an embodiment of the present invention, when the ratio of the total area ($b_1$) of the second surface forming the second convex portions to the total area (A) of the filter membrane in a plan view is 50-70%, when the ratio of the second convex portions is relatively large, an area (volume) of the rib portion is increased. Therefore, the filter membrane can have a higher mechanical strength.

Next, a specific shape of a filter membrane according to an embodiment of the present invention is described.

In a filter membrane according to an embodiment of the present invention, the specific shape of the filter membrane is not particularly limited. However, as illustrated in FIG. 1C, when a filter membrane according to an embodiment of the present invention is viewed from the first surface side in a plan view, the first surface forming the first convex portions desirably forms a predetermined pattern in which a shape of a first convex portion repeats two-dimensionally across one or multiple through holes, and the through holes also desirably form a predetermined pattern in which a shape of a through hole repeats two-dimensionally across a first convex portion. However, in the regions opposing the regions where the second convex portions are formed, through holes are not formed. This is because, when through holes are formed, a length of each of the through holes becomes too long so that it is difficult for fine particles to freely move. In portions of the regions opposing the regions where the second convex portions are formed, bottomed holes may be formed.

When the filter membrane is viewed from the first surface side in a plan view, it is desirable that portions of the first surface forming the first convex portions be not connected to each other but be isolated from each other. Specific examples of shapes of the portions of the first surface forming the first convex portions include circular shapes, elliptical shapes, racetrack shapes, and shapes formed by other curves. Further, the shapes of the portions of the first surface forming the first convex portions may be polygonal shapes such as quadrangular shapes. However, as long as the portions of the first surface forming the first convex portions are not entirely connected to each other, some of the first convex portions having the above-described shapes may be connected to each other.

Further, when a filter membrane according to an embodiment of the present invention is viewed from the second surface side in a plan view, portions of the second surface forming the second convex portions are formed so as to be connected to each other, and form the entirely continuous second surface. In addition to the examples such as a shape of sides having predetermined widths forming a honeycomb shape and a shape of sides having predetermined widths forming a lattice shape, the shape of the second surface may also be any other shape as long as the shape forms a structure in which belt-like bodies having predetermined widths are two-dimensionally connected, and the shape of the second surface may also form a structure in which sides having predetermined widths forming different polygonal shapes, circular shapes, elliptical shapes and the like are combined.

Further, it is also possible that the portions of the second surface forming the second convex portions are formed in polygonal shapes and these polygonal shapes are connected by belt-like bodies having predetermined widths.

Another example of the shape, the structure and the like of a filter membrane according to an embodiment of the present invention is further described in detail.

Figure 3A:
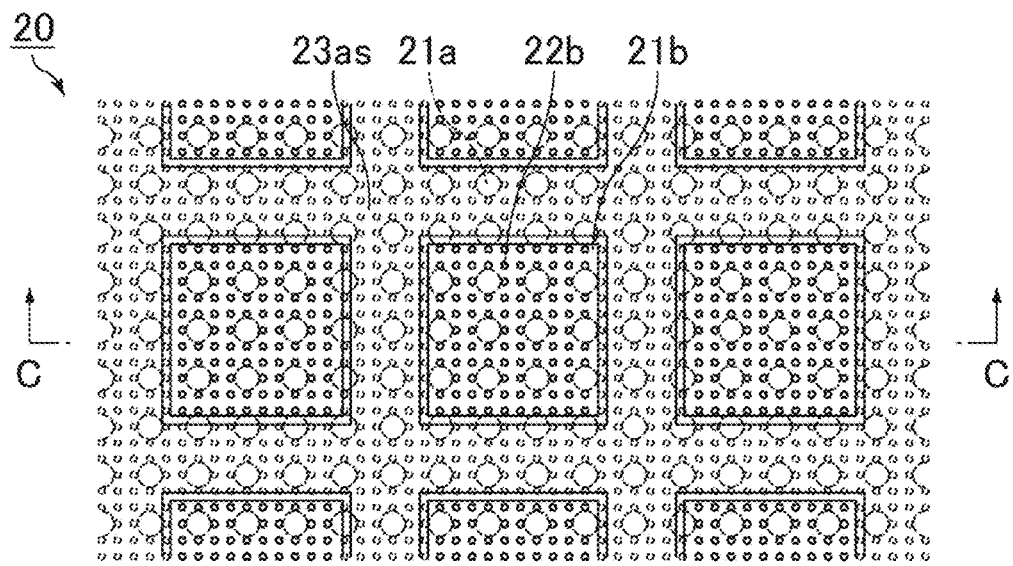
FIG. 3A is a back view schematically illustrating a filter membrane according to another embodiment of the present invention.
Figure 3B:
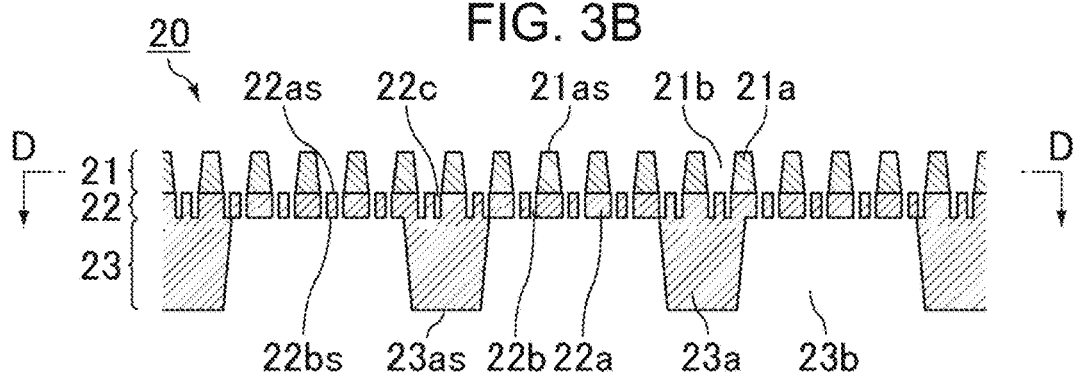
FIG. 3B is a C-C line cross-sectional view of the filter membrane illustrated in FIG. 3A.
Figure 3C:
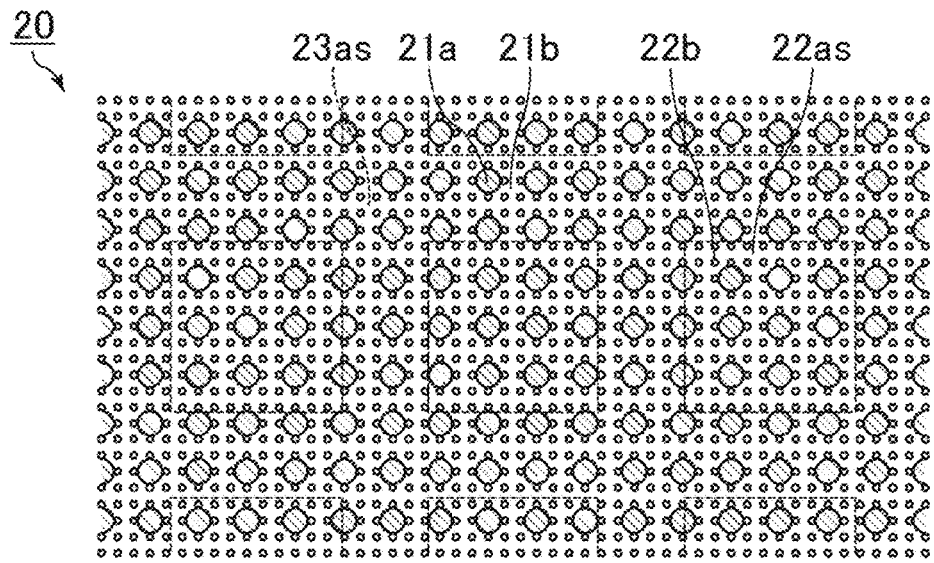
FIG. 3C is a D-D line cross-sectional view of the filter membrane illustrated in FIG. 3B.

FIG. 3A is a back view schematically illustrating another example of a filter membrane according to an embodiment of the present invention. FIG. 3B is a C-C line cross-sectional view of the filter membrane illustrated in FIG. 3A. FIG. 3C is a D-D line cross-sectional view of the filter membrane illustrated in FIG. 3B.

A filter membrane 20 according to an embodiment of the present invention illustrated in FIG. 3A-3C is formed from a first layer 21 having a first surface (21as) on a side where a processing medium is supplied, a third layer 23 having a second surface (23as) on an opposite side with respect to the first surface (21as), and a second layer 22 formed between the first layer 21 and the third layer 23.

The first layer 21 is formed from first convex portions (21a) and first concave portions (21b), the first convex portions (21a) each being formed from an interface (22as) between the second layer 22 and the first layer 21 toward the first surface (21as) and each being provided such that a cross-sectional area thereof parallel to the first surface (21as) gradually decreases with a decreasing distance to the first surface (21as), and the first concave portions (21b) each having a bottom at the interface (22as) between the second layer 22 and the first layer 21.

The third layer 23 is formed from second convex portions (23a) and second concave portions (23b), the second convex portions (23a) each being formed from an interface (22bs) between the second layer 22 and the third layer 23 toward the second surface (23as) and each being provided such that a cross-sectional area thereof parallel to the second surface (23as) gradually decreases with a decreasing distance to the second surface (23as), and the second concave portions (23b) each having a bottom at the interface (22bs) between the second layer 22 and the third layer 23. As illustrated in FIG. 3A, the second concave portions (23b) each have a larger area than each of the first concave portions (21b) and are scattered in a form of islands, and the second convex portions (23a) formed around the second concave portions (23b) are formed so as to be connected to each other and have the entirely continuous second surface (23as).

Further, in regions of the second layer 22 where the second concave portions (23b) are formed, through holes (22b) communicatively connecting the first concave portions (21b) and the second concave portions (23b) are formed. Also in this case, a portion of the second layer 22 other than the through holes (22b) is referred to as a second layer membrane portion (22a). Further, in regions of the second layer 22 opposing the second convex portions (23a), bottomed holes (22c) are formed.

In the back view illustrated in FIG. 3A, the second surface (23as) forming the second convex portions (23a) is formed in a shape of sides having predetermined widths forming a lattice shape in a plan view, and is entirely connected together, and the second concave portions (23b) are each formed in a square shape in a plan view and are scattered in a form of islands.

In a filter membrane according to an embodiment of the present invention illustrated in FIG. 3A-3C, a thick continuous portion (rib portion) including the second layer and the second convex portions evenly spreads in all directions. Therefore, the filter membrane can have a higher mechanical strength and a more excellent self-supporting property, and can sufficiently maintain its shape with a film membrane alone. Therefore, when an inspection, an experiment or the like is performed, the filter membrane is excellent in handleability.

Other structures of a filter membrane according to an embodiment of the present invention illustrated in FIG. 3A-3C are the same as those of a filter membrane according to an embodiment of the present invention illustrated in FIGS. 1A-1C and thus a detailed description thereof is omitted here.

Next, a method for manufacturing a filter membrane according to an embodiment of the present invention is described.

A method for manufacturing a filter membrane according to an embodiment of the present invention is not particularly limited, but preferably includes processes described below.

(1) First Master Mold Fabrication Process

First, a first master mold fabrication process is performed in which a front side master mold is fabricated including a flat plate-shaped base part and a front side filter membrane part which is formed on the base part and has the same shape as the above-described first layer and second layer of a filter membrane according to an embodiment of the present invention.

(2) Second Master Mold Fabrication Process

Next, a second master mold fabrication process is performed in which a back side master mold is fabricated including a flat plate-shaped base part and a back side filter membrane part which is formed on the base part and has the same shape as the above-described third layer of a filter membrane according to an embodiment of the present invention.

(3) First Transfer Mold Fabrication Process

Next, a first transfer mold fabrication process is performed in which a front side mirror image mold is fabricated by thermally laminating a transparent thermoplastic resin film on the front side master mold fabricated in the above process and peeling off the transparent thermoplastic resin film after the concave-convex shape of the front side master mold has been transferred thereto.

(4) Second Transfer Mold Fabrication Process

Next, a second transfer mold fabrication process is performed in which a back side mirror image mold is fabricated by thermally laminating a transparent thermoplastic resin film on the back side master mold fabricated in the above process and peeling off the transparent thermoplastic resin film after the concave-convex shape of the back side master mold has been transferred thereto.

(5) Filter Membrane Fabrication Process

In this filter membrane fabrication process, after a flat plate-shaped photosensitive resin film composed of a photosensitive resin is formed, the photosensitive resin film is pressed against the back side mirror image mold fixed on the base part to transfer thereto the shape of the third layer of the filter membrane formed in the back side mirror image mold. Thereafter, the front side mirror image mold is further pressed against the photosensitive resin film from above to transfer thereto the shape of the first layer and the second layer of the filter membrane. Then, the photosensitive resin layer in this state is cured, and a filter membrane having the same shape as a filter membrane according to an embodiment of the present invention is formed on the base part.

As described above, in a method for manufacturing a filter membrane according to an embodiment of the present invention, the front side master mold and the back side master mold fabricated in the first master mold fabrication process and the second master mold fabrication process are used to perform the first transfer mold fabrication process and the second transfer mold fabrication process, and the front side mirror image mold and the back side mirror image mold fabricated in the first transfer mold fabrication process and the second transfer mold fabrication process are used to manufacture a final filter membrane. Therefore, manufacture of a filter membrane having structures such as shapes of through holes and the like as designed can be performed many times with good reproducibility.

In the method for manufacturing a filter membrane according to an embodiment of the present invention, it is also possible that a filter membrane according to an embodiment of the present invention is manufactured by performing the same processes as the first master mold fabrication process and the second master mold fabrication process and then pasting together a fabricated film in which the first layer and the second layer are formed and a fabricated film in which the third layer is formed.

Next, a method for manufacturing a filter membrane according to an embodiment of the present invention is further described in detail.

(1) First Master Mold Fabrication Process

In a method for manufacturing a filter membrane according to an embodiment of the present invention, as the first master mold fabrication process, a front side master mold is fabricated including a flat plate-shaped base part and a front side filter membrane part which is formed on the base part and has the same shape as the above-described first layer and second layer of a filter membrane according to an embodiment of the present invention.

A method for fabricating a master mold is not particularly limited. However, a method can be adopted in which a resin master mold is fabricated on the base part using at least one of a photolithography method and an etching method.

FIG. 4A-4F are cross-sectional views schematically illustrating the first master mold fabrication process in an example of a method for manufacturing a filter membrane according to an embodiment of the present invention. In the manufacturing method illustrated in FIGS. 4A-4F and 5A-5C, as a master mold, a resin master mold is fabricated.

A resin forming the front side master mold and the back side master mold is not particularly limited. However, the same resin material as the resin material forming a filter membrane according to an embodiment of the present invention can be used. Examples of the resin material include a silicone-based resin, an acrylic resin, a polyimide resin, a phenol resin, a silica hybrid composite and the like. These resins are highly flexible and thus have excellent mechanical properties and are unlikely to be worn away even when being used many times in mirror image mold fabrication. In the following processes, among the above-described resins, a negative type photosensitive resin is used. However, it is also possible that a positive type photosensitive resin is used.

That is, which photosensitive resin (resist) is to be used may be determined according to sizes and widths of the portions of the first surface forming the first convex portions to be formed, sizes of the through holes to be formed, and the like. For example, in a case where the first convex portions having the first surface of which the portions each have a width of 2 µm or less, and the through holes are formed, a high-performance positive type resist can be used, and in a case where the first convex portions having the first surface of which the portions each have a width of 2 µm or more, and the through holes are formed, a negative type resist can be used.

Figure 4A:
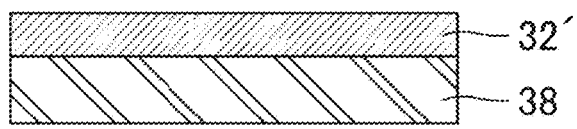
FIG. 4A-4F are cross-sectional views schematically illustrating a first master mold fabrication process in a method for manufacturing a filter membrane according to an embodiment of the present invention.
Figure 4B:
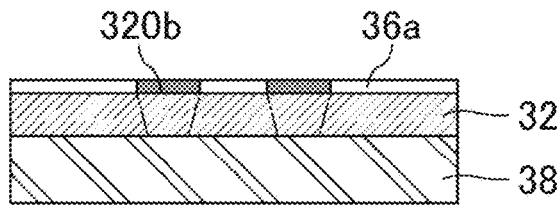

In this first master mold fabrication process, first, on a base part 38, after preparing a coating liquid in which the above-described resin is dissolved in a solvent or the like, the coating liquid is applied and dried, and a coating layer (32') is formed (see FIG. 4A). After the formation of the coating layer (32'), the coating layer (32') is cured to form a cured resin layer 32. Subsequently, a glass plate (36a), which is patterned so as to expose a portion other than a cured resin layer surface (320b) having the shape of the through holes in a plan view, is set as a mask and exposure is performed (see FIG. 4B). As a light source for the exposure, a lamp or the like is used.

A material of the base part is not particularly limited, and examples thereof include thermosetting resins such as a bismaleimide triazine resin, an epoxy resin and a silicone-based resin, metals such as silicon, ceramics such as alumina and glass, and the like. In a method for manufacturing a filter membrane according to an embodiment of the present invention, the same material as described above can also be used for the base part used in the following description.

Figure 4C:
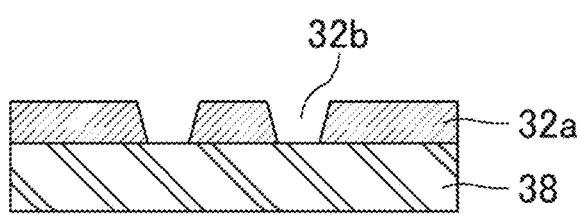

Next, the cured resin layer 32 is brought into contact with a liquid developer for a predetermined time period to dissolve and remove a portion including the cured resin layer surface (320b) to form through holes (32b) and a second layer membrane portion (32a) (see FIG. 4C).

Figure 4D:
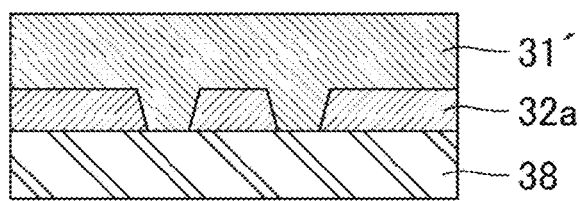
Figure 4E:
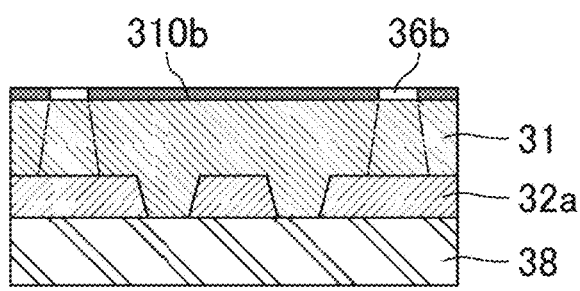

Next, again, the coating liquid is applied and dried to form a coating layer (31') (see FIG. 4D). Next, the coating layer (31') is cured to form a cured resin layer 31. A glass plate (36b), which is patterned so as to expose a portion other than a cured resin layer surface (310b) having the shape of the first concave portions, is set as a mask, and exposure is performed (see FIG. 4E).

Next, the cured resin layer 31 is brought into contact with a liquid developer for a predetermined time period to dissolve and remove a portion including the cured resin layer surface (310b) to form first concave portions (31b) and the through holes (32b). As a result, fabrication of a front side master mold (30a) having the second layer membrane portion (32a), the through holes (32b), first convex portions (31a) and the first concave portions (31b) on the base part 38 is completed (see FIG. 4F). The second layer membrane portion (32a) is treated so as not to dissolve in the second exposure. Further, the base part 38 needs to be formed of a material that is not etched even when the material is in contact with the liquid developer.

In the above process, the through holes and the first concave portions are formed by performing coating layer formation twice and performing development processing twice. However, it is also possible that the through holes and the first concave portions are formed by performing coating layer formation once and performing development processing once.

(2) Second Master Mold Fabrication Process

Next, as the second master mold fabrication process, a back side master mold is fabricated including a flat plate-shaped base part and a back side filter membrane part which is formed on the base part and has the same shape as the above-described third layer of a filter membrane according to an embodiment of the present invention.

Figure 5A:
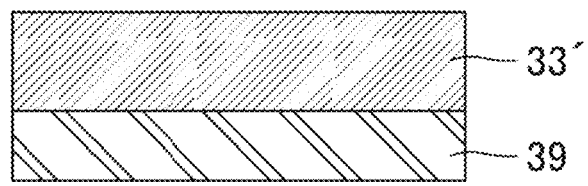
FIG. 5A-5C are cross-sectional views schematically illustrating a second master mold fabrication process in a method for manufacturing a filter membrane according to an embodiment of the present invention.
Figure 5B:
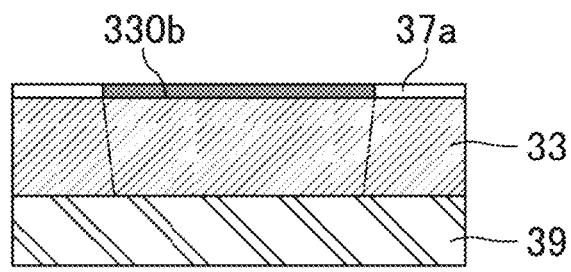
Figure 5C:
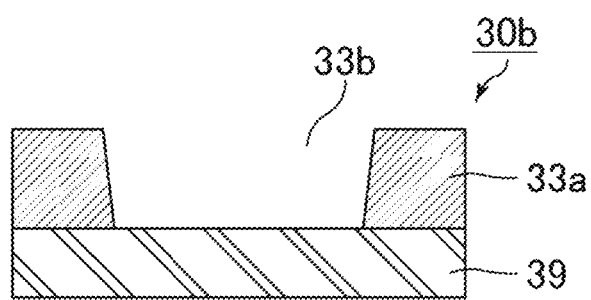

FIG. 5A-5C are cross-sectional views schematically illustrating the second master mold fabrication process in the example of a method for manufacturing a filter membrane according to an embodiment of the present invention.

In this second master mold fabrication process, first, on a base part 39, after preparing a coating liquid in which the above-described resin is dissolved in a solvent or the like, the coating liquid is applied and dried, and a coating layer (33') is formed (see FIG. 5A). After the formation of the coating layer (33'), the coating layer (33') is cured to form a cured resin layer 33. Subsequently, a glass plate (37a), which is patterned so as to expose a portion other than a cured resin layer surface (330b) having the shape of the second concave portions in a plan view, is set as a mask and exposure is performed (see FIG. 5B).

Next, the cured resin layer 33 is brought into contact with a liquid developer for a predetermined time period to dissolve and remove a portion including the cured resin layer surface (330b) to form second concave portions (33b) (see FIG. 5C), and fabrication of a back side master mold (30b) having second convex portions (33a) and the second concave portions (33b) is completed.

In the above-described first master mold fabrication process and second master mold fabrication process, a master mold is fabricated by exposure and development using a patterned glass plate as a mask. However, it is also possible that a master mold is fabricated by subjecting a specific region such as a portion where a through hole is to be formed to irradiation, exposure, and development processing using a focused light source such as a laser source without using a mask. When concave portions such as the through holes and the first concave portions having different depths are formed, by adjusting output of laser or the like according to a place to be irradiated, an exposure depth can be adjusted. As a result, the through holes and the first concave portions can be formed at once. Further, when a glass plate is used as a mask, the through holes and the first concave portions can be formed at once, for example, by performing exposure using a glass plate that is shaded differently between a portion for a through hole and a portion for a first concave portion.

(3) First Transfer Mold Fabrication Process

FIG. 6A-6D are cross-sectional views schematically illustrating the first transfer mold fabrication process in the example of a method for manufacturing a filter membrane according to an embodiment of the present invention.

In the first transfer mold fabrication process according to an embodiment of the present invention, a transparent thermoplastic resin film (40') (see FIG. 6B) is used to transfer thereto a concave-convex shape of the front side master mold (30a) (see FIG. 6A), which is fabricated in the first master mold fabrication process and has the second layer membrane portion (32a), the through holes (32b), the first convex portions (31a) and the first concave portions (31b) on the base part 38, by thermally laminating the thermoplastic resin film (40') on the front side master mold (see FIG. 6C). Thereafter, the thermoplastic resin film (40') is peeled off Thereby, a front side mirror image mold (40*a*) is fabricated (see FIG. 6D).

Examples of a material for the transparent thermoplastic resin film used in the first transfer mold fabrication process and the second transfer mold fabrication process include a cycloolefin polymer, polyvinyl chloride (PVC), a polycarbonate (PC) based resin, a polyamide resin, an acrylic resin such as a polymethyl methacrylate resin, a polystyrene resin, and the like.

In the above process, the front side mirror image mold (40*a*) is fabricated by thermally laminating the transparent thermoplastic resin film (40'). However, it is also possible that the front side mirror image mold is fabricated by applying a liquid resin on the base part 38 and curing the resin by heating or the like and then peeling off the resin. According to this method, the front side mirror image mold can be fabricated by using a thermosetting resin such as a silicone-based resin.

A temperature of the thermal lamination is preferably 80-200° C., and a time period of the thermal lamination is preferably 0.5-5 minutes.

(4) Second Transfer Mold Fabrication Process

FIG. 7A-7D are cross-sectional views schematically illustrating the second transfer mold fabrication process in the example of a method for manufacturing a filter membrane according to an embodiment of the present invention.

Figure 7A:
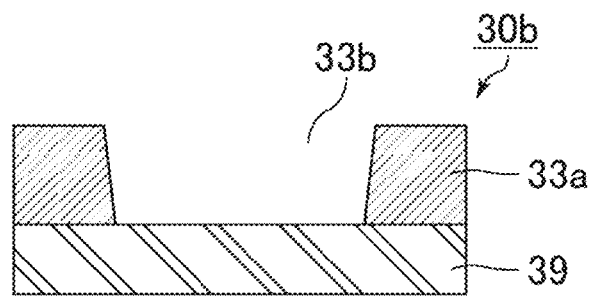
FIG. 7A-7D are cross-sectional views schematically illustrating a second transfer mold fabrication process in a method for manufacturing a filter membrane according to an embodiment of the present invention.
Figure 7B:
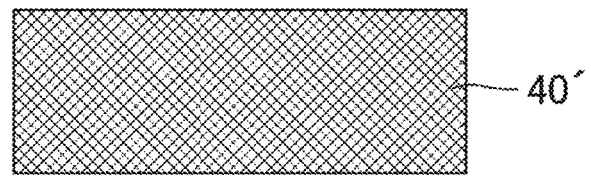
Figure 7C:
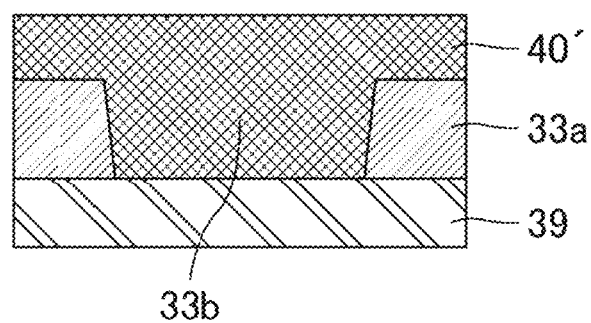
Figure 7D:
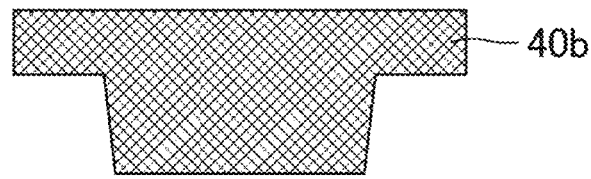

In the second transfer mold fabrication process according to an embodiment of the present invention, a transparent thermoplastic resin film (40') (see FIG. 7B) is used to transfer thereto a concave-convex shape of the back side master mold (30*b*) (see FIG. 7A), which is fabricated in the second master mold fabrication process and has the second convex portions (33*a*) and the second concave portions (33*b*) on the base part 39, by thermally laminating the thermoplastic resin film (40') on the back side master mold (see FIG. 7C). Thereafter, the thermoplastic resin film (40') is peeled off. Thereby, a back side mirror image mold (40*b*) is fabricated (see FIG. 7D).

(5) Filter Membrane Fabrication Process

FIG. 8A-8D are cross-sectional views schematically illustrating the filter membrane fabrication process in the example of a method for manufacturing a filter membrane according to an embodiment of the present invention.

Figure 8A:
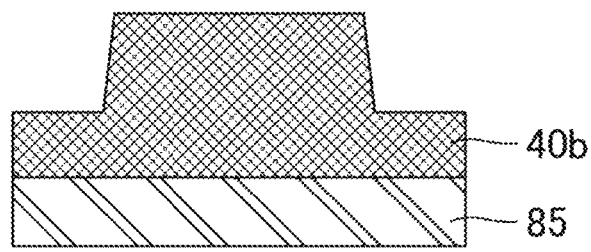
FIG. 8A-8D are cross-sectional views schematically illustrating a filter membrane fabrication process in a method for manufacturing a filter membrane according to an embodiment of the present invention.
Figure 8B:
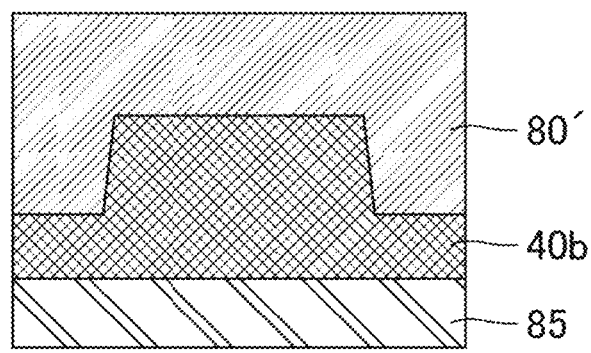
Figure 8C:
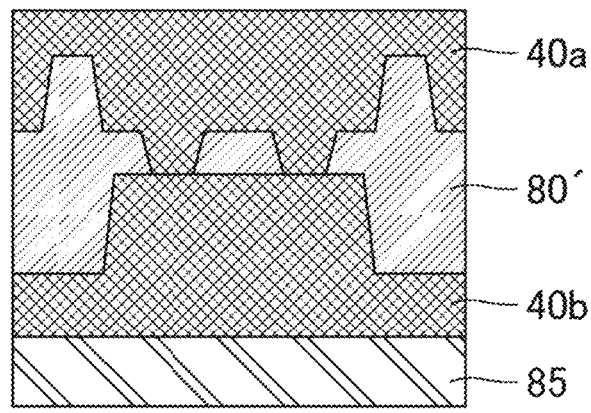
Figure 8D:
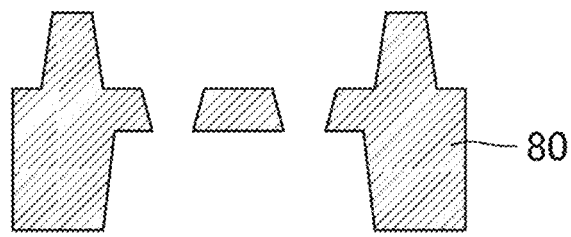

In the filter membrane fabrication process according to an embodiment of the present invention, the back side mirror image mold (40*b*) is pasted onto another base part 85 having a flat surface (see FIG. 8A), and a photosensitive resin film (80') formed of a photosensitive resin is pressed against the transparent back side mirror image mold (40*b*) to transfer thereto the shape of the third layer of the filter membrane formed in the back side mirror image mold (40*b*) (see FIG. 8B). Thereafter, the front side mirror image mold (40*a*) is further pressed against the photosensitive resin film (80') from above to transfer thereto the shape of the first layer and the second layer of the filter membrane (see FIG. 8C). Thereafter, ultraviolet light or the like is irradiated via the transparent front side mirror image mold (40*a*) to cure the photosensitive resin film (80'), and a filter membrane 80 having the same shape as the filter membrane is fabricated. By peeling off the back side mirror image mold (40*b*) and the front side mirror image mold (40*a*), fabrication of a filter membrane 80 according to an embodiment of the present invention is completed (see FIG. 8D).

The photosensitive resin film (80') can be formed by applying a photosensitive resin dissolved in a solvent on a flat plate having a flat surface and drying the photosensitive resin and then peeling off the photosensitive resin. Examples of the photosensitive resin include a polysilicone-based resin, an acrylic resin, a phenol resin, a polyimide resin, a silica hybrid composite and the like.

In the above filter membrane fabrication process, a photosensitive resin is used. However, it is also possible that a thermosetting silicone-based resin or the like is used and the thermosetting silicone-based resin or the like is sandwiched between back side mirror image mold (40*b*) and front side mirror image mold (40*a*), and then, the resin is cured by heating or the like.

In a method for manufacturing a filter membrane according to an embodiment of the present invention, in the first master mold fabrication process or the second master mold fabrication process, it is also possible to use a photolithography method and/or an etching method to fabricate a silicon or glass master mold in which the base part and the filter membrane part formed on the base part are integrally formed.

FIG. 9A-9F are cross-sectional views schematically illustrating a first master mold fabrication process in an example of another method for manufacturing a filter membrane according to an embodiment of the present invention. In the manufacturing method illustrated in FIG. 9A-9F, as a master mold, a silicon or glass master mold is fabricated.

Figure 9A:
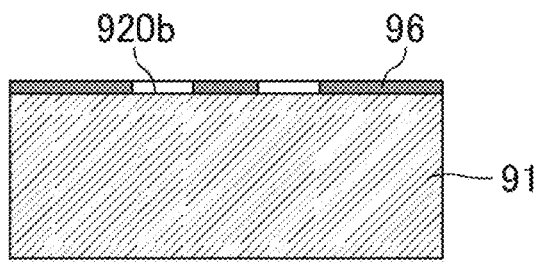
FIG. 9A-9F are cross-sectional views schematically illustrating a first master mold fabrication process in a method for manufacturing a filter membrane according to another embodiment of the present invention.
Figure 9B:
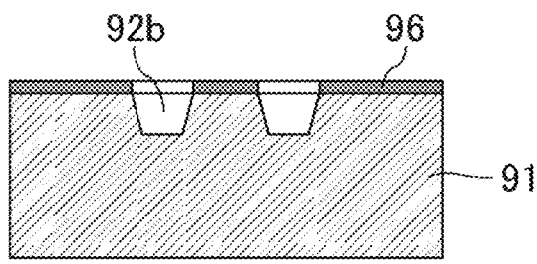

In the first master mold fabrication process, first, using a photolithography method, an etching resist layer 96 is formed on a surface of a silicon or glass base material 91 so as to expose a base material surface (920*b*) having the shape of the through holes in a plan view (see FIG. 9A).

A glass material is not particularly limited. For example, general purpose glass such as soda glass, heat resistant glass such as quartz glass and tempax can be used.

Figure 9C:
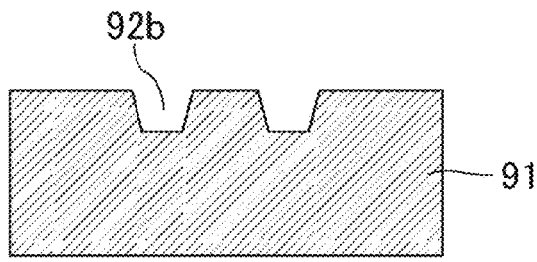

Next, the base material surface (920*b*) is brought into contact with an etching gas for a predetermined time period to form through holes (92*b*), which will become the through holes, in the base material 91 (see FIG. 9B), and the etching resist layer 96 is peeled off (see FIG. 9C).

Figure 9D:
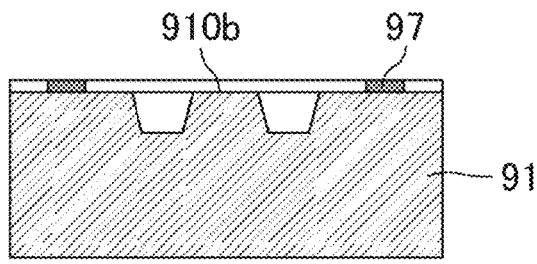

Next, using a photolithography method, another etching resist layer 97 is forming on the base material 91 having concave portions (92*b*) for the through hole so as to expose a base material surface (910*b*) having the shape of the first concave portions (see FIG. 9D).

Figure 9E:
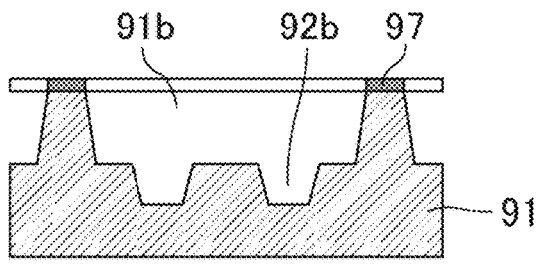
Figure 9F:
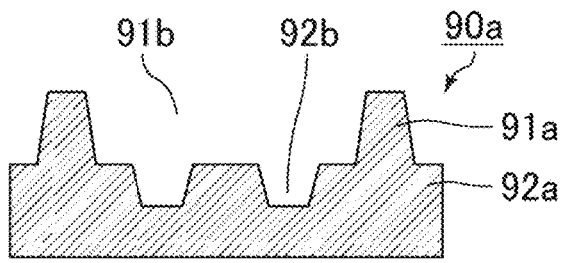

Next, by bringing the base material surface (910*b*) on which the etching resist layer 97 is forming into contact with an etching gas for a predetermined time period, first concave portions (91*b*) and through holes (92*b*) having predetermined depths are formed in the base material 91 (FIG. 9E). By peeling off the etching resist layer 97, a silicon or glass front side master mold (90*a*) having a second layer membrane portion (92*a*), the through holes (92*b*), first convex portions (91*a*) and first concave portions (91*b*) is fabricated (FIG. 9F).

In the fabricated front side master mold, the base part and the filter membrane part are integrally formed. The back side master mold can also be fabricated using the same method.

A method for manufacturing a filter membrane according to an embodiment of the present invention using the fabricated front side master mold (90*a*) and back side master mold is the same as the method for manufacturing the filter membrane described above using FIGS. 6A-8D, and thus a description thereof is omitted here.

EXAMPLES

In the following, examples that more specifically describe the present invention are provided. The present invention is not limited to these examples.

Example 1

(1) First Master Mold Fabrication Process

On a surface of a base part 38 formed of a bismaleimide triazine resin, a coating liquid prepared by dissolving a photosensitive acrylic resin in diethylene glycol dimethyl ether was applied and dried to form a coating layer (32') (FIG. 4A). After the formation of the coating layer (32'), the coating layer (32') was cured to form a cured resin layer 32, and, a glass plate (36a), which was patterned so as to expose a portion other than a cured resin layer surface (320b) having the shape of the through holes in a plan view, was set as a mask and exposure was performed (see FIG. 4B).

Next, the cured resin layer 32 was brought into contact with a liquid developer for a predetermined time period to dissolve and remove a portion including the cured resin layer surface (320b) to form through holes (32b) (see FIG. 4C).

Next, again, the coating liquid was applied and dried to form a coating layer (31') (see FIG. 4D). Next, the coating layer (31') was cured to form a cured resin layer 31. A glass plate (36b), which is patterned so as to expose a portion other than a cured resin layer surface (310b) having the shape of the first concave portions, was set as a mask, and exposure was performed (see FIG. 4E).

Figure 4F:
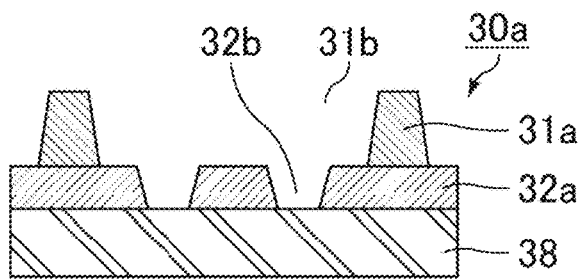

Next, the cured resin layer 31 was brought into contact with a liquid developer for a predetermined time period to dissolve and remove a portion including the cured resin layer surface (310b) to form the first concave portions (31b) and the through holes (32b). As a result, fabrication of the front side master mold (30a) having the second layer membrane portion (32a), the through holes (32b), the first convex portions (31a) and the first concave portions (31b) was completed (FIG. 4F). The second layer membrane portion (32a) is treated so as not to dissolve in the second exposure.

(2) Second Master Mold Fabrication Process

On a surface of a base part 39 formed of a bismaleimide triazine resin, a coating liquid prepared by dissolving a photosensitive acrylic resin in diethylene glycol dimethyl ether was applied and dried to form a coating layer (33') (FIG. 5A). After the formation of the coating layer (33'), the coating layer (33') was cured to form a cured resin layer 33. Subsequently, a glass plate (37a), which was patterned so as to expose a portion other than a cured resin layer surface (330b) having the shape of the second concave portions in a plan view, was set as a mask and exposure was performed (see FIG. 5B).

Next, the cured resin layer 33 was brought into contact with a liquid developer for a predetermined time period to dissolve and remove a portion including the cured resin layer surface (330b) to form second concave portions (33b) (see FIG. 5C), and fabrication of the back side master mold (30b) having the second convex portions (33a) and the second concave portions (33b) was completed.

(3) First Transfer Mold Fabrication Process

A transparent thermoplastic resin film (40') formed of a cycloolefin polymer (see FIG. 6B) was used to transfer thereto a concave-convex shape of the front side master mold (30a) (see FIG. 6A), which was fabricated in the first master mold fabrication process and had the second layer membrane portion (32a), the through holes (32b), the first convex portions (31a) and the first concave portions (31b) on the base part 38, by thermally laminating the thermoplastic resin film (40') on the front side master mold (see FIG. 6C). Thereafter, the thermoplastic resin film (40') was peeled off Thereby, a front side mirror image mold (40a) was fabricated (see FIG. 6D).

(4) Second Transfer Mold Fabrication Process

A transparent thermoplastic resin film (40') formed of a cycloolefin polymer (see FIG. 7B) was used to transfer thereto a concave-convex shape of the back side master mold (30b) (see FIG. 7A), which was fabricated in the second master mold fabrication process and had the second convex portions (33a) and the second concave portions (33b) on the base part 39, by thermally laminating the thermoplastic resin film (40') on the back side master mold (see FIG. 7C). Thereafter, the thermoplastic resin film (40') was peeled off. Thereby, a back side mirror image mold (40b) was fabricated (see FIG. 7D).

(5) Filter Membrane Fabrication Process

The back side mirror image mold (40b) was pasted onto another base part 85 having a flat surface (see FIG. 8A), and a photosensitive resin film (80') formed of a photosensitive polyimide resin was pressed against the transparent back side mirror image mold (40b) to transfer thereto the shape of the third layer of the filter membrane formed in the back side mirror image mold (40b) (see FIG. 8B). Thereafter, the front side mirror image mold (40a) was further pressed against the photosensitive resin film (80') from above to transfer thereto the shape of the first layer and the second layer of the filter membrane (see FIG. 8C). Thereafter, ultraviolet light or the like was irradiated via the transparent front side mirror image mold (40a) to cure the photosensitive resin film (80'), and a filter membrane 80 having the same shape as the filter membrane was fabricated. By peeling off the back side mirror image mold (40b) and the front side mirror image mold (40a), fabrication of a filter membrane 80 according to an embodiment of the present invention was completed (see FIG. 8D).

In the formed filter membrane 80, the through holes (32b) each had a diameter of 0.5 μm at an interface between the second layer and the third layer.

In Example 1, a negative type photosensitive resin was used to manufacture the filter membrane. However, even when a positive type photosensitive resin is used, a filter membrane having the same structure can be manufactured. That is, it is also possible that a positive type photosensitive resin is used to fabricate a first master mold and a second master mold, and, in the filter membrane fabrication process, a negative type photosensitive resin is used to manufacture a filter membrane.

Example 2

(1) First Master Mold Fabrication Process

Figure 10A:
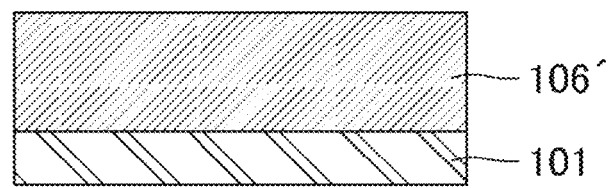
FIG. 10A-10C are cross-sectional views schematically illustrating a first master mold fabrication process in a method for manufacturing a filter membrane according to Example 2 of the present invention.
Figure 10B:
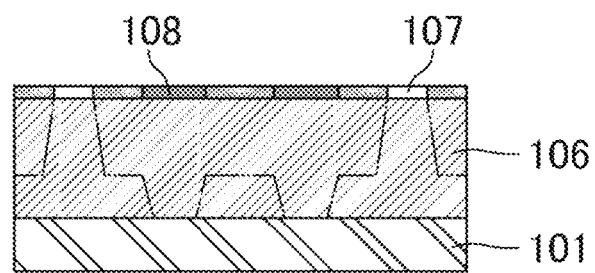
Figure 10C:
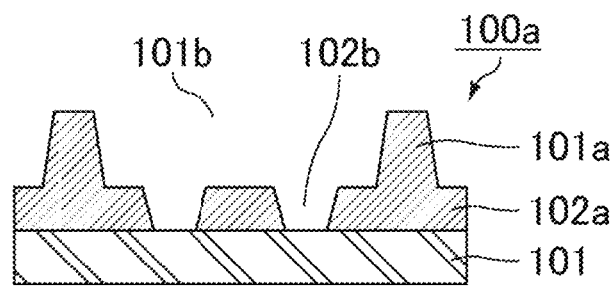

FIG. 10A-10C are cross-sectional views schematically illustrating a first master mold fabrication process in a method for manufacturing a filter membrane of Example 2.

On a base part 101, after a coating liquid was prepared by dissolving the above-described resin in a solvent or the like, the coating liquid was applied and dried, and a coating layer (106') for the first layer and the second layer was formed (see FIG. 10A).

After the formation of the coating layer (106'), the coating layer (106') was cured to form a cured resin layer 106, and a glass plate 107, which was patterned so as to expose a cured resin layer surface 108, was set as a mask and exposure was performed. However, in this case, portions for the first concave portions and portions for the through holes can be collectively exposed by performing exposure by forming, as the pattern of the glass plate 107, a pattern having shading that is different between the portions for the first concave portions and the portions for the through holes (see FIG. 10B).

Thereafter, the cured resin layer 106 was brought into contact with a liquid developer for a predetermined time period to dissolve and remove a portion including the cured resin layer surface 108 to form first concave portions (101b) and through holes (102b). As a result, fabrication of a front side master mold (100a) having a second layer membrane portion (102a), the through holes (102b), first convex portions (101a) and the first concave portions (101b) was completed (FIG. 10C).

Thereafter, in the same way as in Example 1, (2) the second master mold fabrication process, (3) the first transfer mold fabrication process, (4) the second transfer mold fabrication process, and (5) the filter membrane fabrication process were performed, and the filter membrane of the present invention was fabricated.

In the formed filter membrane, the through holes (102b) each had a diameter of 0.5 µm at an interface between the second layer and the third layer.

Example 3

(1) First Master Mold Fabrication Process

First, using a photolithography method, an etching resist layer 96 was formed on a surface of a silicon base material 91 so as to expose a base material surface (920b) having the shape of the through holes in a plan view (see FIG. 9A).

Next, the base material surface (920b) was brought into contact with an etching gas for a predetermined time period to form through holes (92b) in the base material 91 (see FIG. 9B), and the etching resist layer 96 was peeled off (see FIG. 9C).

Next, using a photolithography method, another etching resist layer 97 was formed on the base material 91 having the through holes (92b) so as to expose a base material surface (910b) having the shape of the first concave portions (see FIG. 9D).

Next, by bringing the base material surface (910b) on which the etching resist layer 97 was formed into contact with an etching gas for a predetermined time period, the first concave portions (91b) and the through holes (92b) having predetermined depths were formed in the base material 91 (FIG. 9E). By peeling off the etching resist layer 97, the silicon front side master mold (90a) having the second layer membrane portion (92a), the through holes (92b), the first convex portions (91a) and the first concave portions (91b) was fabricated (FIG. 9F).

Thereafter, in the same way as in Example 1, (2) the second master mold fabrication process, (3) the first transfer mold fabrication process, (4) the second transfer mold fabrication process, and (5) the filter membrane fabrication process were performed, and a filter membrane according to an embodiment of the present invention was fabricated.

In the formed filter membrane, the through holes (92b) each had a diameter of 0.5 µm at an interface between the second layer and the third layer.

To allow a shape to be maintained with a film alone, the filter membrane of Japanese Patent Laid-Open Publication No. 2008-86996 includes a polymer filter layer having multiple precision-formed micron-scale pores penetrating therethrough in a thickness direction and a polymer support layer having a precision-formed porous support structure. By adopting a relatively thick structure as described above, a filter membrane can be fabricated that allows a shape to be maintained with a film alone and does not cause massive irreversible aggregation.

For a filter membrane as described in Japanese Patent Laid-Open Publication No. 2008-86996, the filter membrane is fabricated by separately fabricating a polymer filter layer and a polymer support layer and laminating and bonding the two layers to each other. However, there is a problem that, in order to prevent peeling between the polymer filter layer and the polymer support layer and to prevent breakage of a fabricated filter membrane and to ensure bonding strength, a bonding process becomes complicated.

Further, during the bonding process, the polymer support layer may partially block the pores of the polymer filter layer and variation in pore areas or pore diameters is likely to occur. Therefore, there is a problem that, when the filter membrane is used in an application such as an inspection or an experiment, data with poor reproducibility is obtained.

Further, when attempting to fabricate a filter membrane having a relatively thick structure using a photolithography method or an etching method, shapes of the pores may become non-uniform due to distortion during exposure or variation in etching amount or the like. Therefore, similar to the above, there is a problem that, when the filter membrane is used in an application such as an inspection or an experiment, data with poor reproducibility is obtained.

Further, in a case where only pores are formed on a plane, when the filter membrane is used as a filter, there is a problem that substances larger in shape than the pores may block the pores and filtration in a short time period is likely to become difficult.

A filter membrane according to an embodiment of the present invention, when used in an application such as an inspection or an experiment, allows a filtration process to efficiently proceed by having openings that are unlikely to be blocked by other substances, and allows data with good reproducibility to be obtained.

A filter membrane according to an embodiment of the present invention has multiple through holes that selectively separate a specific material in a processing medium from other materials.

A filter membrane according to an embodiment of the present invention includes: a first layer having a first surface on a side where the processing medium is supplied; a third layer having a second surface on an opposite side with respect to the first surface; and a second layer formed between the first layer and the third layer.

The first layer includes: first convex portions that are each formed from an interface between the second layer and the first layer toward the first surface and are each provided such that a cross-sectional area thereof parallel to the first surface gradually decreases with a decreasing distance to the first surface; and first concave portions that each have a bottom at the interface between the second layer and the first layer.

The third layer includes: second convex portions that are each formed from an interface between the second layer and the third layer toward the second surface and are each provided such that a cross-sectional area thereof parallel to the second surface gradually decreases with a decreasing distance to the second surface; and second concave portions that each have a bottom at the interface between the second layer and the third layer. The second concave portions each have a larger area than each of the first concave portions and are scattered in a form of islands, and the second convex portions formed around the second concave portions are forming so as to be connected to each other and have the entirely continuous second surface.

In regions of the second layer where the second concave portions are formed, the through holes are forming communicatively connecting the first concave portions and the second concave portions.

At least the first concave portions formed in regions opposing the second convex portions are connected to each other.

In a filter membrane according to an embodiment of the present invention, since the first convex portions are each formed such that the cross-sectional area thereof parallel to the first surface gradually decreases with a decreasing distance to the first surface, conversely, a cross-sectional area of each of the first concave portions parallel to the first surface gradually increases with a decreasing distance to the first surface. As a result, during filtration, even when substances not to be filtered larger than the through holes formed in the second layer approach the first surface, gaps are likely to be formed between the through holes and the substances not to be filtered, and the through holes are unlikely to be blocked. As a result, the filter membrane is unlikely to be blocked by the substances not to be filtered.

Further, at least the first concave portions formed in the regions opposing the second convex portions are connected to each other. As a result, the filter membrane is structured such that a liquid to be filtered flowing into the entire surface thereof can flow toward the through holes. Therefore, the filter membrane has a large filtration capacity, and, when the filter membrane is used in an application such as an inspection or an experiment, a filtration process can be efficiently performed, and data with good reproducibility can be obtained.

In a filter membrane according to an embodiment of the present invention, a thick portion (rib portion) including the second layer and the second convex portions continuously exists over the entire filter membrane. Therefore, the filter membrane has a high mechanical strength while having flexibility, and is self-supportive, and, even when the filter membrane is not supported by any other support or the like, the filter membrane can maintain its shape with a film membrane alone, and the film membrane does not cause massive irreversible aggregation. Further, due to the above characteristics, breakage of the filter membrane due to a temperature change or a pressure during use of the filter can be prevented.

A filter membrane according to an embodiment of the present invention can be used as a filter membrane for removing dust, viruses, bacteria and the like present in air or a gas of a specific component and a liquid to obtain clean air, gas, liquid and the like, and, conversely, can also be used as a filter membrane for obtaining, by selectively filtering and separating, only particles, viruses, bacteria, cells and the like of specific sizes present in air or a gas of a specific component and a liquid, and, in particular, can be suitably used as a filter membrane for separating solid contents such as cells or blood cells from a body fluid.

In a filter membrane according to an embodiment of the present invention, it is desirable that the filter membrane be entirely formed of the same material and be integrally formed.

When the filter membrane is entirely formed of the same material and is integrally formed, the filter membrane can have more excellent mechanical properties without causing layer separation as in a case where two layers are adhered to each other, and variation in pore areas or pore diameters is unlikely to occur. Therefore, when the filter membrane is used in an application such as an inspection or an experiment, data with good reproducibility can be obtained.

In a filter membrane according to an embodiment of the present invention, the second surface forming the second convex portions is desirably formed in a shape of sides having predetermined widths forming a honeycomb shape.

In a filter membrane according to an embodiment of the present invention, when the second surface forming the second convex portions is formed in a shape of sides having predetermined widths forming a honeycomb shape, the thick continuous portion (rib portion) including the second layer and the second convex portions evenly spreads in all directions. Therefore, the filter membrane can have a higher mechanical strength and a more excellent self-supporting property, and can sufficiently maintain its shape with the film membrane alone. Therefore, when an inspection, an experiment or the like is performed, the filter membrane is excellent in handleability.

In a filter membrane according to an embodiment of the present invention, the second surface forming the second convex portions is desirably formed in a shape of sides having predetermined widths forming a lattice shape.

In a filter membrane according to an embodiment of the present invention, when the second surface forming the second convex portions is formed in a shape of sides having predetermined widths forming a lattice shape, similar to the case of a honeycomb shape, the thick continuous portion (rib portion) including the second layer and the second convex portions evenly spreads in all directions. Therefore, the filter membrane can have a higher mechanical strength and a more excellent self-supporting property, and can sufficiently maintain its shape with the film membrane alone. Therefore, when an inspection, an experiment or the like is performed, the filter membrane is excellent in handleability.

In a filter membrane according to an embodiment of the present invention, in a cross-sectional shape perpendicular to the first surface including one of the first convex portions, an angle formed by a wall surface of the one of the first convex portions and the first surface is desirably 43-80 degrees.

In a filter membrane according to an embodiment of the present invention, when the angle formed by the wall surface of the first convex portion and the first surface is 43-80 degrees, the first concave portions are each formed such that the cross-sectional area thereof parallel to the first surface gradually increases with a decreasing distance to the first surface. Therefore, the filter membrane is unlikely to be blocked by substances not to be filtered, and filtration can be continuously performed over a long time period, and a filtration process can be efficiently completed.

In a filter membrane according to an embodiment of the present invention, in a cross-sectional shape perpendicular to the second surface including one of the second convex portions, an angle formed by a wall surface of the one of the second convex portions and the second surface is desirably 43-80 degrees.

In a filter membrane according to an embodiment of the present invention, in a cross-sectional shape perpendicular to the second surface including one of the second convex portions, when the angle formed by the wall surface of the one of the second convex portions and the second surface is 43-80 degrees, the second concave portions are each formed such that the cross-sectional area thereof parallel to the second surface gradually increases with a decreasing distance to the second surface. Therefore, a liquid contained in an object to be filtered can be easily discharged, and a filtration process can be efficiently performed.

In a filter membrane according to an embodiment of the present invention, a diameter of each of the through holes communicatively connecting the first concave portions and the second concave portions is desirably 0.1-1.0 μm.

In a filter membrane according to an embodiment of the present invention, when the diameter of each of the through holes communicatively connecting the first concave portions and the second concave portions is 0.1-1.0 μm, extremely fine dust, viruses and the like can be removed from a gas or the like containing the dust, the viruses and the like. Further, fine components in a liquid such as those that form cells can also be selectively separated by filtration.

In a filter membrane according to an embodiment of the present invention, a thickness of the second convex portions forming the third layer is desirably larger than a total thickness of the first layer (first convex portions) and the second layer.

In a filter membrane according to an embodiment of the present invention, when the thickness of the second convex portions forming the third layer is larger than the total thickness of the first layer and the second layer, the mechanical strength of the rib portion supporting the entire filter membrane is increased, and the self-supportability is increased.

In a filter membrane according to an embodiment of the present invention, a total thickness of the first layer, the second layer and the third layer is preferably 15 μm or less.

When the thickness of the filter membrane exceeds 15 μm, shapes of the through holes become non-uniform due to distortion during exposure or variation in etching amount or the like, and, when the filter membrane is used in an application such as an inspection or an experiment, data with poor reproducibility is obtained. However, in the filter membrane of the present invention, when the total thickness of the first layer, the second layer and the third layer is as small as 15 μm or less, the shapes of the through holes can be kept uniform, and data with excellent reproducibility can be easily obtained. Further, since the filter membrane is thin, substances to be filtered can easily pass through, and filtration can be efficiently and quickly performed.

In a filter membrane according to an embodiment of the present invention, a ratio of an area of the first surface forming the first convex portions per unit area to an area of the second surface forming the second convex portions per unit area is desirably 50-90%.

In a filter membrane according to an embodiment of the present invention, when the ratio of the area of the first surface forming the first convex portions per unit area to the area of the second surface forming the second convex portions per unit area is 50-90%, an area (volume) of the second convex portions which is on an opposite side with respect to the side where the processing medium is supplied is increased. Therefore, the filter membrane can have a higher mechanical strength, and a wide filtration area can be obtained.

In a filter membrane according to an embodiment of the present invention, a ratio of a total area ($a_1$) of the first surface forming the first convex portions to a total area (A) of the filter membrane in a plan view is desirably 20-50%.

In a filter membrane according to an embodiment of the present invention, when the ratio of the total area ($a_1$) of the first surface forming the first convex portions to the total area (A) of the filter membrane in a plan view is 20-50%, when the ratio of the first convex portions is relatively small, an area of the first concave portions per unit area becomes sufficiently large and an area of a portion of the through holes performing filtration can be increased. Therefore, filtration can be efficiently performed.

In a filter membrane according to an embodiment of the present invention, a ratio of a total area ($b_1$) of the second surface forming the second convex portions to the total area (A) of the filter membrane in a plan view is preferably 50-70%.

In a filter membrane according to an embodiment of the present invention, when the ratio of the total area ($b_1$) of the second surface forming the second convex portions to the total area (A) of the filter membrane in a plan view is 50-70%, when the ratio of the second convex portions is relatively large, an area (volume) of the rib portion is increased. Therefore, the filter membrane can have a higher mechanical strength.

Obviously, numerous modifications and variations of the present invention are possible in light of the above teachings. It is therefore to be understood that within the scope of the appended claims, the invention may be practiced otherwise than as specifically described herein.

What is claimed is:

1. A filter membrane, comprising:
a membrane having a plurality of through holes configured to selectively separate a specific material from other materials in a processing medium, the membrane comprising a first layer, a second layer and a third layer formed such that the first layer has a first surface configured to be supplied with the processing medium, the third layer has a second surface on an opposite side with respect to the first surface of the first layer, and the second layer is formed between the first layer and the third layer,
wherein the first layer includes a plurality of first convex portions and a plurality of first concave portions formed such that each of the first convex portions is formed from an interface between the second layer and the first layer toward the first surface of the first layer and has a cross-sectional area parallel to the first surface gradually decreasing toward the first surface of the layer, and that each of the first concave portions has a bottom at the interface between the second layer and the first layer, the third layer includes a plurality of second convex portions and a plurality of second concave portions formed such that each of the second convex portions is formed from an interface between the second layer and the third layer toward the second surface and has a cross-sectional area parallel to the second surface gradually decreasing toward the second surface, and that each of the second concave portions has a bottom at the interface between the second layer and the third layer and has a larger area than each of the first concave portions, the third layer is formed such that the second convex portions are formed to surround the second concave portions and connected to one another, the second layer has a plurality of through holes connecting the second concave portions and a first set of the first concave portions, and the first concave portions includes a second set of the first concave portions formed in regions opposing the second convex portions such that the second set of the first concave portions in each of the regions is connected to each other.

2. The filter membrane according to claim 1, wherein the membrane is formed of a same material such that the first layer, the second layer and the third layer are integrally formed.

3. The filter membrane according to claim 1, wherein the plurality of the second convex portions forms the second surface of the third layer in a honeycomb shape.

4. The filter membrane according to claim 1, wherein the plurality of the second convex portions forms the second surface of the third layer in a lattice shape.

5. The filter membrane according to claim 1, wherein the first layer is formed such that each of the first convex portions has a cross-sectional shape perpendicular to the first surface such that an angle formed by a wall surface of each of the first convex portions and the first surface is in a range of 43 to 80 degrees.

6. The filter membrane according to claim 1, wherein the third layer is formed such that each of the second convex portions has a cross-sectional shape perpendicular to the second surface such that an angle formed by a wall surface of each of the second convex portions and the second surface is in a range of 43 to 80 degrees.

7. The filter membrane according to claim 1, wherein the second layer is formed such that a diameter of each of the through holes connecting the first concave portions and the second concave portions is in a range of 0.1 to 1.0 µm.

8. The filter membrane according to claim 1, wherein the third layer is formed such that a thickness of each of the second convex portions is greater than a total thickness of the first layer and the second layer.

9. The filter membrane according to claim 1, wherein the membrane is formed such that a total thickness of the first layer, the second layer and the third layer is 15 µm or less.

10. The filter membrane according to claim 1, wherein the first layer and the third layer are formed such that a ratio of an area of the first surface formed by the first convex portions per unit area to an area of the second surface formed by the second convex portions per unit area is in a range of 50 to 90%.

11. The filter membrane according to claim 1, wherein the first layer and the third layer are formed such that a ratio of a total area $a_1$ of the first surface formed by the first convex portions to a total area A of the membrane is in a range of 20 to 50%.

12. The filter membrane according to claim 1, wherein the first layer and the third layer are formed such that a ratio of a total area $b_1$ of the second surface formed by the second convex portions to a total area A of the membrane is in a range of 50 to 70%.

13. The filter membrane according to claim 2, wherein the plurality of the second convex portions forms the second surface of the third layer in a honeycomb shape.

14. The filter membrane according to claim 2, wherein the plurality of the second convex portions forms the second surface of the third layer in a lattice shape.

15. The filter membrane according to claim 2, wherein the first layer is formed such that each of the first convex portions has a cross-sectional shape perpendicular to the first surface such that an angle formed by a wall surface of each of the first convex portions and the first surface is in a range of 43 to 80 degrees.

16. The filter membrane according to claim 2, wherein the third layer is formed such that each of the second convex portions has a cross-sectional shape perpendicular to the second surface such that an angle formed by a wall surface of each of the second convex portions and the second surface is in a range of 43 to 80 degrees.

17. The filter membrane according to claim 2, wherein the second layer is formed such that a diameter of each of the through holes connecting the first concave portions and the second concave portions is in a range of 0.1 to 1.0 µm.

18. The filter membrane according to claim 2, wherein the third layer is formed such that a thickness of each of the second convex portions is greater than a total thickness of the first layer and the second layer.

19. The filter membrane according to claim 2, wherein the membrane is formed such that a total thickness of the first layer, the second layer and the third layer is 15 µm or less.

20. The filter membrane according to claim 2, wherein the first layer and the third layer are formed such that a ratio of an area of the first surface formed by the first convex portions per unit area to an area of the second surface formed by the second convex portions per unit area is in a range of 50 to 90%.

* * * * *